United States Patent [19]
Ogawa et al.

[11] Patent Number: 5,398,554
[45] Date of Patent: Mar. 21, 1995

[54] CORIOLIS FLOWMETER WITH NATURAL FREQUENCY ADJUSTING MEANS ENGAGED WITH THE COUNTERBALANCING CONDUIT

[75] Inventors: Yutaka Ogawa; Shingo Gomi, both of Tokyo, Japan

[73] Assignee: Oval Corporation, Tokyo, Japan

[21] Appl. No.: 147,175

[22] Filed: Nov. 1, 1993

[30] Foreign Application Priority Data

Nov. 19, 1992 [JP] Japan ................... 4-310534

[51] Int. Cl.$^6$ ............................................. G01F 1/84
[52] U.S. Cl. ................... 73/861.38; 73/861.37
[58] Field of Search ........... 73/861.36, 861.37, 861.38, 73/32 A

[56] References Cited

U.S. PATENT DOCUMENTS

| | | | |
|---|---|---|---|
| 3,955,401 | 5/1976 | Catherall | 73/32 A |
| 4,252,028 | 2/1981 | Smith et al. | 23/861.38 |

FOREIGN PATENT DOCUMENTS

| | | |
|---|---|---|
| 261436 | 3/1988 | European Pat. Off. . |
| 473919 | 3/1992 | European Pat. Off. . |
| 0524523 | 1/1993 | European Pat. Off. .......... 73/861.38 |
| 4143361 | 3/1993 | Germany . |
| 2071321 | 9/1981 | United Kingdom . |
| 8706691 | 11/1987 | WIPO . |

OTHER PUBLICATIONS

Patent Abstracts of Japan, vol. 12, No. 470 (P-798) 9 Dec. 1988 & JP-A-63 191 024 (Oval).
Patent Abstracts of Japan, vol. 6, No. 237 (P-157) 25 Nov. 1982 & JP-A-57 137 818 (Tokyo Keiki).

*Primary Examiner*—Richard E. Chilcot, Jr.
*Assistant Examiner*—Harshad Patel
*Attorney, Agent, or Firm*—Jordan and Hamburg

[57] ABSTRACT

A Coriolis flowmeter of double conduit type having inner and outer conduits, is capable of effectively detecting with increased stability a Coriolis force acting on the inner fluid passage without being effected by external vibration, e.g., of piping, piping stress and a change of ambient temperature and the like. A cylindrical housing 33, connected with flanges 31 and 32 to flow piping, has a thick-walled cylindrical body 33a and end portions 33b each having a center bore 32c communicating with a cavity formed in the housing 33. The housing 33 accommodates an inner conduit 35 and an outer conduit 34 mounted coaxially with each other and secured each at both ends to the opposite end portions 33b. A vibrator 36 and sensors 37 and 38 are mounted between the inner conduit 35 and the outer conduit 34 that is equipped with an adjusting balancer 39 to obtain a resonant frequency of the same natural vibrations of the two conduits.

8 Claims, 9 Drawing Sheets

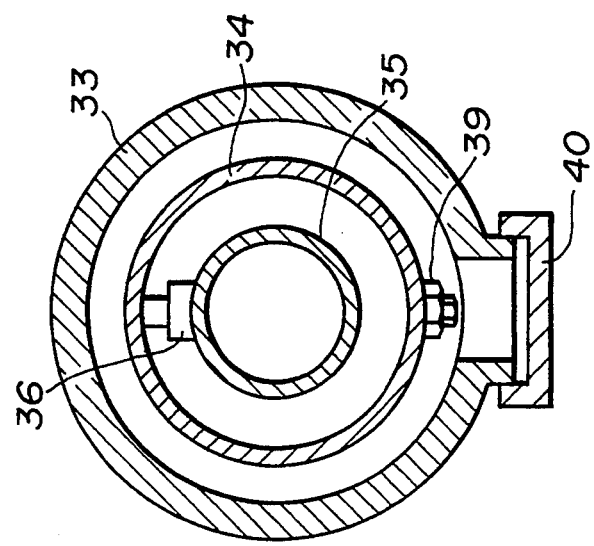
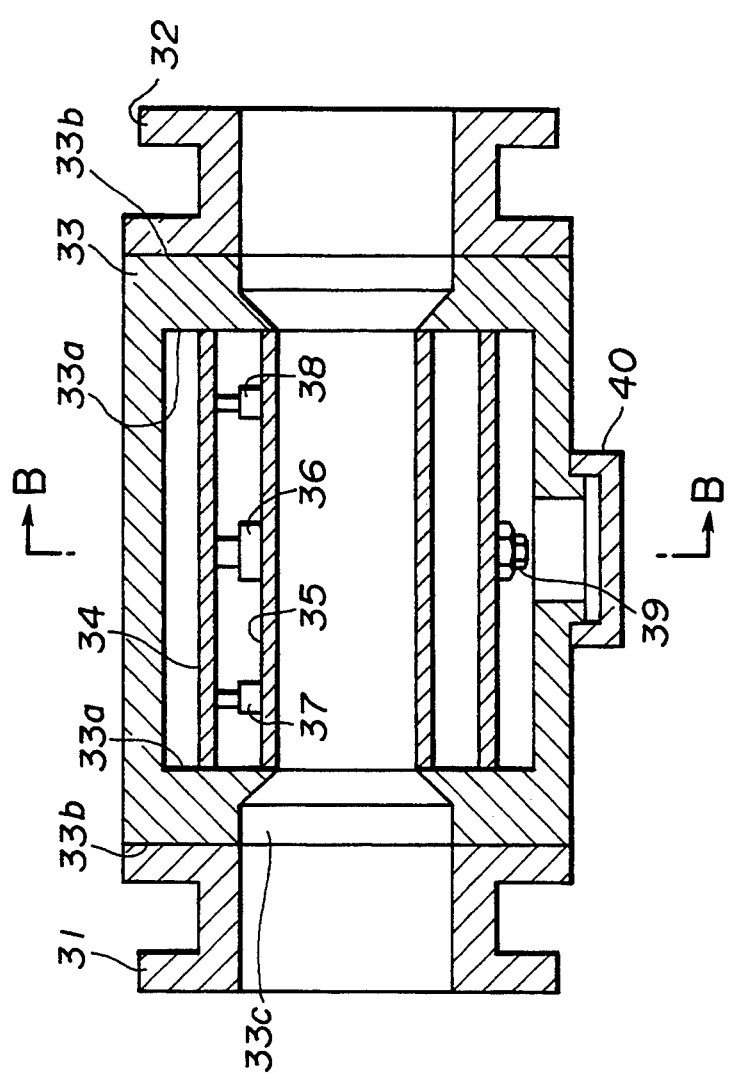
FIG.3(a)
FIG.3(b)

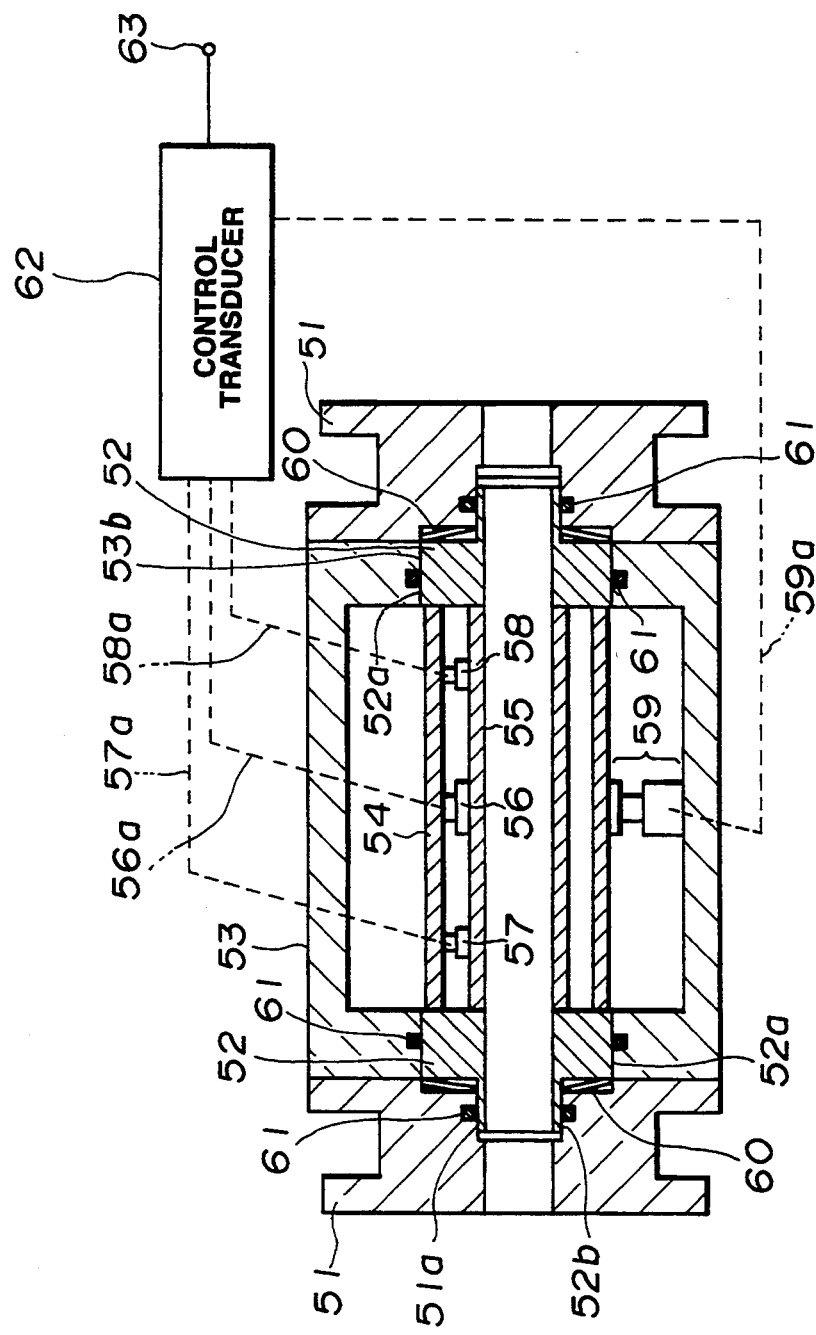

CORIOLIS FLOWMETER WITH NATURAL FREQUENCY ADJUSTING MEANS ENGAGED WITH THE COUNTERBALANCING CONDUIT

BACKGROUND OF THE INVENTION

The present invention relates to a Coriolis flowmeter and, more particularly, to the construction of a double-conduit type or counterbalanced type Coriolis flowmeter.

When a measuring conduit, supported at both ends on a supporting means, is driven with alternate oscillation at its center portion in a direction perpendicular to its axis, a phase difference is produced between the supporting points and the center portion of the measuring conduit. This phase difference is produced by the action of a Coriolis force and has a value proportional to the driving frequency and mass flow rate. A straight conduit type Coriolis flowmeter which measures mass flow by detecting the phase difference of its straight measuring conduit is well known.

A straight conduit type Coriolis flowmeter has a most simple configuration and may be formed smaller in the direction perpendicular to the fluid's direction of flow but the straight measuring conduit, supported at both ends, has a high amount of rigidity in the direction perpendicular to its axis and has low sensitivity with a low S/N ratio. To attain high sensitivity, the measuring conduit must have thin walls and be elongated enough in the flow's direction. This means that a straight conduit is not always advantageous in the construction of the flowmeter. In addition, thus designed flowmeters are easily effected by external vibrations due to decreased resonance frequency. Furthermore, the natural frequency of the measuring conduit shall be changed by the deformation due to the pressure deviation of the fluid in the measuring conduit. The Japanese publication of the unexamined application No. 63-158419 discloses a straight conduit type Coriolis flowmeter wherein at least one measuring conduit is mounted within a supporting cylinder and supported at both ends by means of ring diaphragms. The measuring conduit having both ends fixed, may be subjected to mechanical stress produced therein by thermal deformation and thereby its natural frequency changes, resulting in the transmission of the oscillating energy of the conduit to the supporting cylinder and a connecting conduit. The application of the ring diaphragms aims to solve the above-mentioned problem by utilizing its elasticity.

This method is effective for removing noise due to measuring conditions if the straight conduit remains the same size and form but it involves the problem that the ring diaphragms, directly supporting the measuring conduit ends, may show signs of fatigue, after a long period of use, resulting in the decreased reliability of its operation. Furthermore, it is well known that the measuring pipe has a radically enlarged section at the ring diaphragms, whereat fluid cavities appear because of noisy vibrations, resulting in a serious decrease in the stability of the measurement. To sense the Coriolis force with high sensitivity, the conventional straight conduit type flowmeter must have an elongated measuring conduit to decrease the rigidity or it will require an increase in the quantity of flowing fluid. If the measuring conduit is made longer, it developes a lower natural frequency and thereby is easily effected by external vibrations. Increasing the quantity of the fluid results in increasing a loss of pressure in the measuring conduit.

As described above, a conventional Coriolis flowmeter has a driving means to drive a measuring conduit having fixed ends to oscillate at its natural oscillation frequency by which the driving energy can be minimized. For this purpose, a positive feedback loop is composed of a measuring conduit, a driving means for oscillating the measuring conduit, a sensor for sensing the oscillating amplitude of the measuring conduit (This sensor is commonly used for sensing the Coriolis force), and an amplifier circuit for amplifying the sensor's signal and the driving means to oscillate the conduit at a constant oscillating amplitude.

The driving means may be composed of e.g., a core and an electromagnetic coil, to which AC current is supplied to produce an alternating electromagnetic force used to attract and repel the core. This driving means is mounted between a fixed base and the measuring conduit disposed parallel to the fixed base and resting at both ends thereon. To oscillate the measuring conduit more effectively, a counterbalance made in the form of a conduit, a column or a plate having the same natural frequency as the measuring conduit, is used instead of the base, in such a way that the counterbalance is disposed parallel to the measuring conduit and supported at both ends by the supports of the measuring conduit while the driving means is disposed between the measuring conduit and the counterbalance to drive the measuring conduit and the counterbalance like a tuning fork being vibrated.

However, the flowmeter may be used for measuring the flowrate of different kinds of fluids passing through its measuring conduit. The measuring conduit varies in its natural frequency depending on the density of the fluid to be measured. Even when the same kind of fluid is measured, the fluid density varies depending upon its temperature and thereby the natural frequency of the measuring conduit changes. Therefore, there may be a difference between the natural frequency of the measuring conduit and the fixed natural frequency of the counterbalance with no fluid flowing. This means that the measuring conduit cannot effectively be driven.

SUMMARY OF THE INVENTION

The primary object of the present invention is to provide a Coriolis flowmeter capable of measuring Coriolis force with a high stability without being affected by external vibration or stress of piping and a change of ambient temperature and like conditions, which comprises a cylindrical outer housing having a pair of coaxial flanges connected one to each end thereof; an inner conduit having a small diameter and coaxially secured at both ends in the cylindrical outer housing, said inner conduit allowing measurable fluid to enter from the flanged inlet of the cylindrical housing and pass therethrough; an outer conduit secured at both ends to respective inside end-walls of the cylindrical outer housing and being coaxial with the inner conduit; a vibrator disposed at a center portion between the inner conduit and the outer conduit for vibrating the inner conduit and the outer conduit anti-phasely in directions perpendicular to their axes; and a pair of sensors disposed one between the vibrator and each end-wall of the cylindrical housing to sense oscillation therebetween and detect mass flow proportional to a phase difference obtainable between the sensors.

Another object of the present invention is to provide a Coriolis flowmeter capable of effectively detecting a Coriolis force with an increased accuracy, wherein a natural frequency adjusting means is disposed on the outer wall of the center portion of the outer conduit to make the natural frequencies of the inner measuring conduit through which fluid flows and of the outer conduit be substantially equal to each other.

Still another object of the present invention is to provide a Coriolis flowmeter capable of being free from the effect of thermal elongation of inner and an outer conduits making it unnecessary to conduct special operations for temperature compensation, wherein both end-wall portions of the cylindrical outer housing are separated each into a ring portion and a movable disk portion to which the inner measuring conduit and the outer conduit are coaxially secured, sealing means are provided for movably sealing each movable disk portion and each ring portion, and springs are provided for supporting respective movable disk portions being movable in their axial direction.

Another object of the present invention is to provide a Coriolis flowmeter, having a counterbalance and a measuring conduit supported by the counterbalance and allowing fluid to flow therein for measuring a mass flow of fluid. The measuring conduit is effectively driven at a constant oscillation by automatically equalizing, with no need of special adjustments, the natural frequencies of the measuring conduit and counterbalance, even for different kinds of fluids or for fluids at different temperatures. It is also capable of measuring a mass of flowing fluid without being affected by external vibrations and ambient temperature changes.

A further object of the present invention is to provide a Coriolis flowmeter which is capable of driving the measuring conduit with high accuracy and a high stability by adjusting the natural frequency of the counterbalance to be equal to the natural frequency of the measuring conduit when the frequency of the measuring conduit changes due to a change in the density of the fluid's flow therein.

BRIEF DESCRIPTION OF THE DRAWING

FIGS. 3(a) and 3(b) are sectional construction views for explaining an embodiment of a Coriolis flowmeter, according to the present invention.

FIG. 5 is a sectional construction view for explaining another object embodiment of the Coriolis flowmeter, according to the present invention.

DESCRIPTION OF PREFERRED EMBODIMENTS

Figure 1:
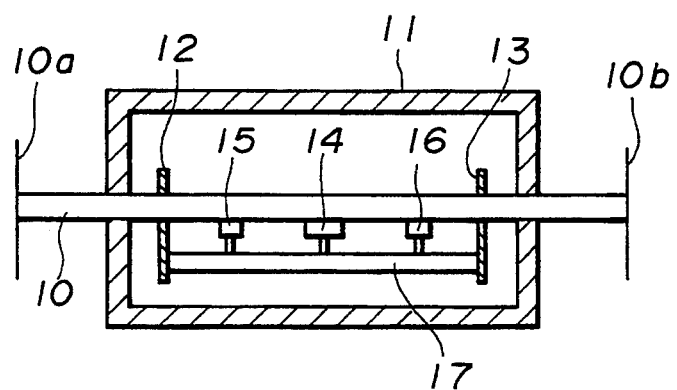
FIG. 1 is a view showing an example of a conventional Coriolis flowmeter having a straight-conduit type counterbalancing mechanism.

FIG. 1 shows a typical construction of a conventional straight-conduit type Coriolis flowmeter. A measuring conduit 10 is connected with fluid inlet and outlet pipes (not shown) by means of its flanges 10a and 10b and is secured near its ends to a frame 11. In the frame 11, the measuring conduit 10 bears supporting plates 12 and 13 fitted thereon at a specified distance from each other, which in turn bears a balancing conduit 17 parallel with the measuring conduit 10. The counterbalancing conduit 17 has no fluid flowing therein. A vibrator 14 is secured at its ends to the middle portions of the measuring conduit 10 and the counterbalancing conduit 17, and sensors 15 and 16 are disposed symmetrically about the vibrator 14 and secured at their ends to the measuring conduit 10 and the counterbalancing conduit 17.

Figure 2:
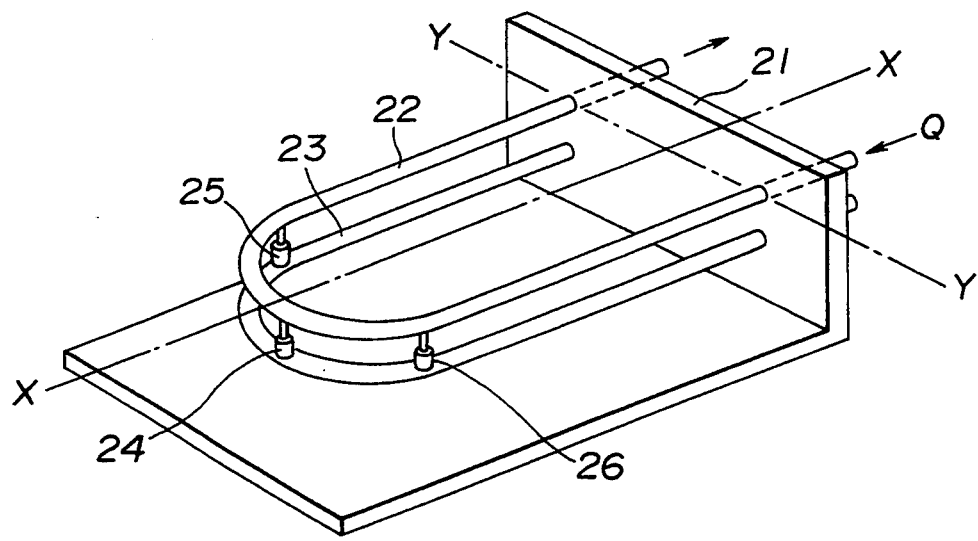
FIG. 2 is a view showing an example of a conventional Coriolis flowmeter having a curved conduit type counterbalancing mechanism.

FIG. 2 is a perspective view of a conventional Coriolis flowmeter having a curved counterbalancing mechanism, wherein a curved measuring conduit 22 is firmly fitted to its projecting ends in the holes drilled in a supporting plate 21 at the positions symmetrically about line X—X and aligned on line Y—Y as shown in FIG. 2, and a counterbalancing conduit 23 made in the same form as the measuring conduit is disposed parallel to the measuring conduit and is firmly fitted at its projecting ends in the holes drilled in the supporting plate 21. The measuring conduit 22 and the counterbalancing conduit 23 have the same natural frequency in the direction of Y—Y at specified conditions. A vibrator 24 is disposed along the line X—X between the measuring conduit 22 and the counterbalancing conduit 23, and sensors 25 and 26 are disposed symmetrically about the line X—X between the measuring conduit 22 and the counterbalancing conduit 23. As described in the case of FIG. 1, the sensors 25 and 26 detect a phase difference caused by the action of a Coriolis force produced in the measuring conduit 22 oscillated by the vibrator 24.

The Coriolis flowmeter must operate with various kinds of fluids to pass through its measuring conduit. Different kinds of fluids may have different values of density. Therefore, the measuring conduit may have different natural frequencies depending upon the density of the fluid to be measured. The measuring conduit may also vary its natural frequency when the density of the fluid changes due to a change in its temperature. In the Coriolis flowmeters of FIGS. 1 and 2, the counterbalancing conduits 17 and 23 have constant values of natural frequency which differ from those of the measuring conduits 10 and 22. This may not only decrease the effectiveness of exciting a conduits' system, but also decrease the accuracy of sensing a flow's rate due to a variation of phase differences of the measuring conduit by a Coriolis force.

FIGS. 3(a) and 3(b) are sectional construction views of a Coriolis flowmeter embodied in the present invention. FIG. 3(a) is a longitudinal section and FIG. 3(b) is a section taken along the plane B—B of FIG. 3(a). As the drawings show, there are shown flanges 31, 32, a cylindrical outer housing 33, an outer conduit 34, an inner conduit 35, a vibrator 36, sensors 37, 38, a balancer 39 for adjusting the natural frequency and a cap 40.

In FIGS. 3(a) and 3(b), the cylindrical housing 33 is connected at both ends 33b with the flanges 31 and 32 to the respective flanges (not shown) of an inlet and an outlet pipe. The housing 33 is a thick-walled cylinder body 33a having end-walls 33b and has apertures (through holes) 33c for effecting the communication of the housing cavity with the fluid's passage. Therefore, the cylindrical housing 33 is considerably heavier than the piping of the same length. The cylindrical housing 33 accommodates an inner conduit 35 coaxially therein and an outer conduit 34. The inner conduit 35 is secured at its ends to the inside end-walls 33b of the housing 33 to form an inner passage between the apertures 33c thereof and the outer conduit 34 is secured at its ends to the inside end-walls 33b of the housing 33. The wall thickness of the inner conduit 35 and the outer conduit 34 is selected preferably in such a way that the two conduits may substantially have the same natural frequency.

The vibrator 36 is mounted on the middle portions of the inner conduit 35 and the outer conduit 34 to drive both conduits anti-phasely in a direction perpendicular to their axes. The vibrator 36 consists of e.g., a coil and a core or a magnet and is driven preferably at a resonant frequency by an external electric power source (not shown). Furthermore, the outer conduit 34 and the inner conduit 35 are provided with the sensors 37 and 38 disposed between the vibrator 34 and the inside end-walls 33b of the housing 33. The sensors 37 and 38 are identical to each other. Each sensor is composed of e.g., a coil and an electromagnet to produce an alternating current corresponding to the oscillations of the outer conduit 34 and the inner conduit 35.

The balancer 39 is secured externally to the middle portion of the outer conduit 34. It consists of e.g., a bolt a and nut for adjusting the natural frequency of the outer conduit 34. Its natural frequency can be increased by increasing the weight of the balancer 39. The natural frequency of the inner conduit 35 may vary depending upon the density of the fluid to be measured therein. Therefore, when the fluid's density changes, the balancer 39 is adjusted to attain the frequency at which the outer conduit 34 has the same natural frequency as the inner conduit 35. The vibrator 36 is also adjusted to drive two conduits at the same resonance frequency. The cap 40 is closed after completion of the above-mentioned adjustments.

In a thus constructed Coriolis flowmeter, when the vibrator 36 drives the inner conduit 35 and the outer conduit 34 at the same resonance frequency, a phase difference of AC signals from the sensors 37 and 38, which is produced by the effect of a Coriolis force, is detected by a mass flow converter (not shown) to determine the mass flowrate of fluid according to the Coriolis force being proportional to the phase difference. At this time, the external vibrations acting on the Coriolis flowmeter have a frequency determined by the mass of said flowmeter. Therefore, both sensors 37 and 38 vibrate at an in-phase external vibration, thereby cancelling the external vibrations, i.e. eliminating the effect of the external vibrations.

Figure 4A:
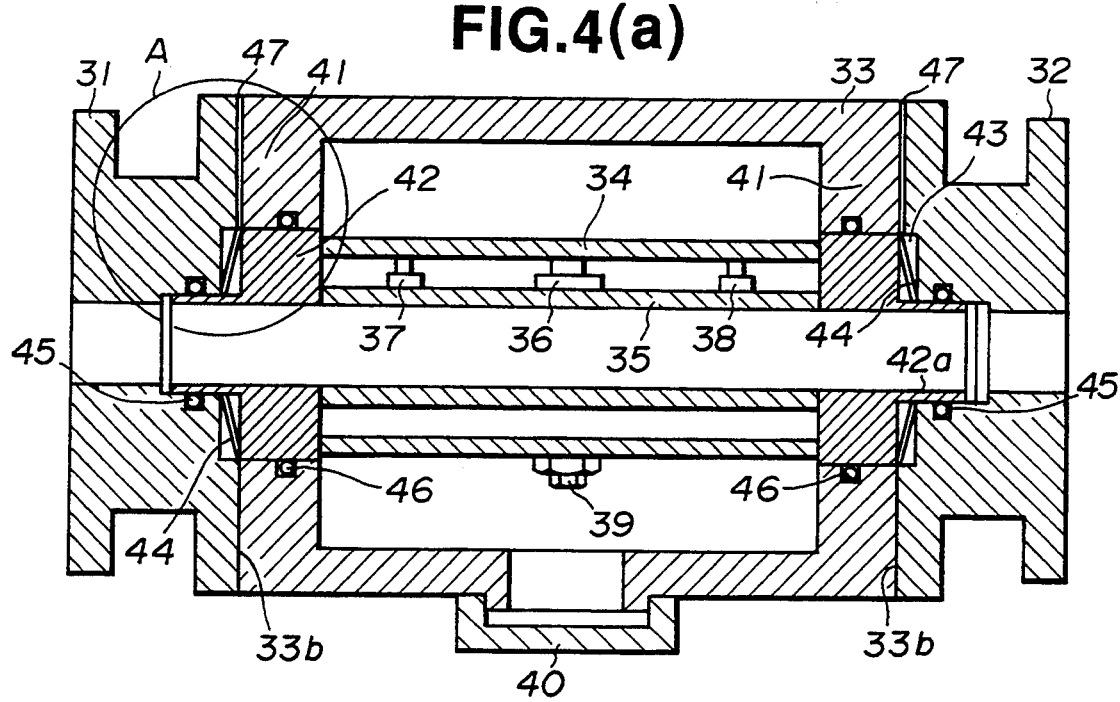
FIGS. 4(a)–4(d) are sectional construction views for explaining another embodiment of a Coriolis flowmeter, according to the present invention.
Figure 4B:
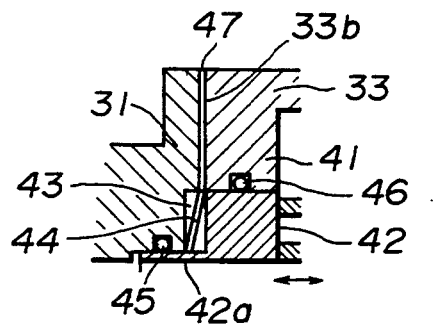
Figure 4C:
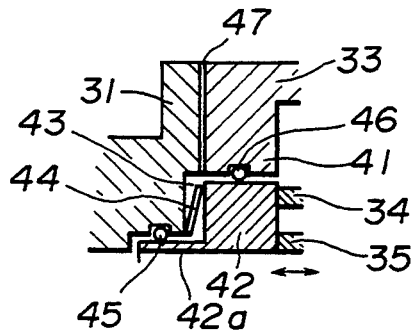
Figure 4D:
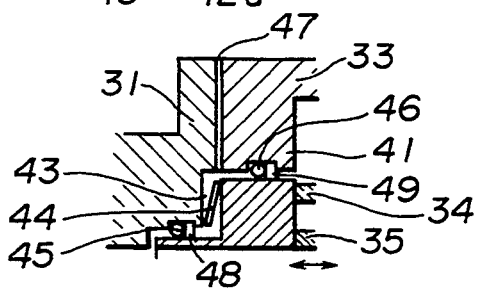

FIG. 4(a) is a longitudinal sectional view for explaining another embodiment of the Coriolis flowmeter, according to the present invention. FIGS. 4(b), 4(c) and 4(d) illustrate different modifications of portion A shown in FIG. 4(a). In the drawings, 41 is an annular ring portion, 42 is a movable disk portion, 43 is a spring chamber, 44 is a leaf spring 45 and 46 are O-rings, 47 is a bleeder hole and other elements similar to those of FIG. 3 are denoted by the same letter or number references.

In FIG. 4(a), both end-walls 33b of a cylindrical outer housing 33 are composed of the movable disks 42 for securing thereto the respective ends of an inner conduit 35 and an outer conduit 34 and the ring portions 41 for sealing liquid-tightly the movable disks 42 with O-rings 45. The movable disks 42 are supported each by a leaf spring 44 in such a way that the disks may move in an axial direction.

FIG. 4(b) shows in detail an example of a portion A of FIG. 4(a) i.e. a supporting portion for a movable disk 42. To prevent fluid from entering into the spring chamber 43, the movable disk 42 has a protrusion in the direction of the flange 31 to form a seal ring 42a with an O-ring 45 for sealing the peripheral surface thereof. To equalize air pressure in the spring chamber 43 with the atmosphere, the bleeder holes 47 are made in the flanges 31 and 32, which communicate with the atmosphere through a gap between the flanges 31, 32 and the cylindrical outer housing 33.

FIG. 4(c) shows in detail another example of the portion A of FIG. 4(a) i.e. the supporting portion of the movable disk 42, which differs from the construction shown in FIG. 4(b) in that O-rings 46 and 45 are disposed respectively, between the movable disk 42 and the ring portion 41 of the housing 33 and between the seal ring portion 42a and the flange 31 to elastically support respective surfaces with a gap therebetween. In a straight conduit type Coriolis flowmeter, having the above-mentioned supporting construction, its cylindrical housing of a high rigidity protects the outer conduit 34 and the inner conduit 35 from the effect of mechanical stress e.g., tension in the direction of the flange's axis, compression and bending due to stress on the piping. The outer conduit 34 and the inner conduit 35 vibrate keeping a mass balance between them. Consequently, the flowmeter can vibrate its inner and outer conduits with a high stability.

FIG. 4(d) shows in detail still another example of the portion A of FIG. 4(a), which differs from that of FIG. 4(c) in that O-rings 45 and 46 are provided with teflon backup rings 48 and 49 respectively to protect O-rings 45 and 46 from being directly subjected to the fluid's pressure thereby, increasing the reliability of sealing and supporting the surfaces. In other words, the use of the backup rings 48 and 49 makes it possible to seal reliable with O-rings and to elastically support the integral construction of the inner and outer conduits.

In a thus constructed straight-conduit type Coriolis flowmeter, the external vibration cannot directly be transmitted to the conduits, thereby the vibration-proofing is considerably improved. Furthermore, when the inner conduit 35 and the outer conduit 34 thermally expand due to the effect of ambient temperature and/or the fluid's temperature, the movable disks 42 move only in an axial direction without changing the internal stress of the inner conduit 35 and the outer conduit 34. Consequently, the flowmeter can perform a stabilized measurement with no considerable change in the natural frequency of the inner conduit.

As is apparent from the foregoing, the above-mentioned Coriolis flowmeter, according to the present invention has the following effects:

(1) Increasing the wall's thickness of the cylindrical outer housing thereby not only eliminating the effect of piping stress but also reducing the effect of the micro-vibrating of the piping to the Coriolis flowmeter which has an increased weight. In addition, a phase difference signal due to a Coriolis force acting on the inner conduit is detected between the outer conduit and the inner conduit, both of which are coaxially secured at both ends to the inside end-walls of the housing. By doing so, in-phase error signals produced by external vibrations can be cancelled. Namely, it is possible to provide a Coriolis flowmeter by adopting a double conduit system composed of an inner conduit of excellent washability through which fluid flows, and an outer conduit, able to attain a high stability of vibration frequency and excellent external-vibration proofing corresponding to that of a parallel conduit type, and able to obtain an excellent S/N ratio with a minimum effect of external vibrations.

(2) It is possible to adjust the outer conduit and the inner conduit so that they have the same natural frequency thereby allowing the measurement to be made in a resonant condition. The Coriolis flowmeter may operate at high sensitivity and with high efficiency.

(3) The inner and outer conduits are secured at their ends to movable disks in such a way that the disks may move only in an axial direction to eliminate the effect of vibration of the outer and inner conduits as well as the effect of the thermal expansion of the outer housing 33. This eliminates the need for provision of a temperature sensor on the outer housing and special operations for temperature compensation.

Another object of the present invention is to provide a mechanism for controlling vibration frequency of the outer conduit which is automatically adjusted by natural frequency of the inner conduit varying in response to density of passing therein fluid.

In the Coriolis flowmeters shown in FIGS. 3 and 4, the measuring conduit and the counterbalancing conduit have different shapes and therefore, different natural frequencies i.e. the counterbalancing conduit has a higher natural frequency than the measuring conduit. Therefore, they cannot effectively be driven. To attain the same natural frequency of the two conduits, a weight 39 is attached to the balancing conduit which may increase its mass and reduce its natural frequency correspondingly. By doing so sufficiently stable measurement is usually realized. However, the natural frequency of the measuring conduit may change if the density of the fluid is considerably changed. This means that a readjustment of the weight 39 is required before measuring the mass flow of the fluid having a different density. The weight adjustment must be done manually.

Similar problems are involved in the counter-balancing type Coriolis flowmeters of FIG. 1 wherein a counterbalancing conduit and a measuring conduit are arranged parallel with each other and secured each at their projecting ends in the fitting holes of common supporting plates, as well as in the flowmeter of FIG. 2 wherein a curved, counterbalancing conduit and a curved measuring conduit are supported each at both ends by the supporting members.

FIG. 5 is a sectional construction view for explaining an example of controlling an outer conduit by applying a load between the outer conduit and a cylindrical housing of the Coriolis flowmeter according to the present invention. The flowmeter comprises flanges 51, movable disks 52, a cylindrical outer housing 53, a counterbalancing conduit 54, a measuring conduit 55, a vibrator 56, sensors 57 and 58, a frequency control unit 59, leaf springs 60, sealing rings 61, a control transducer 62 and a flowrate signal outputting terminal 63.

As shown in FIG. 5, a cylindrical outer housing is provided at both ends with flanges 51 and 51 coaxially united therewith for connecting to pipes (not shown) through which measurable fluid flows. The housing 53 has an outside wall of high rigidity. The counterbalancing conduit 54 has the same length as the measuring conduit 55 and is larger in diameter than the measuring conduit 55. These two conduits are disposed coaxially with each other and secured each at both ends to the movable disks 52.

The movable disks 52, whereto the counter-balancing conduit 54 and the measuring conduit 55 are coaxially secured, have respective guide sleeves 52b coaxially projecting toward the corresponding flanges 51 and are flexibly supported at their peripheral surface 52a by guide bore surfaces 53b in the end-walls of the housing 53 and at their guide sleeves 52b by the guide bore surfaces 51a in the flanges 51 to form a fluid passage therein. The movable disks 52 are also equipped with leaf springs 60 and 60 respectively to allow the axial movement of the disks. The above-mentioned supporting system eliminates the effect of external vibrations, piping stress and the thermal expansion of metals and further isolates the vibrating members i.e. the measuring conduit 55 and the counterbalancing conduit 54 which may achieve stabilized vibrations as a tuning fork does thereby keeping its mass balanced. The measuring conduit 55, connected coaxially with flow pipes is sealed by the use of seal rings 61 and 61 to prevent leakage of the fluid into the housing 53.

The vibrator 56 is mounted at the middle portions on the measuring conduit 55 and counterbalancing conduit 54. The paired sensors 57 and 58, which sense a phase difference proportional to a Coriolis force acting on the measuring conduit, are arranged symmetrically about the vibrator 56 on the measuring conduit 55 and counterbalancing conduit 54. At the middle portion, between the counterbalancing conduit 54 and the cylindrical housing 53, there is a frequency control unit 59 which cooperates with the control transducer 62 (to be described later) to drive the counterbalancing conduit 54 at a frequency equal to the natural frequency of the measuring conduit 55. In the Coriolis flowmeter of FIG. 5, the housing 53 united with the flanges 51 and 51, for connecting with pipes, may be subjected to piping stress but an essential part of the flowmeter i.e. the counterbalancing conduit 54 and the measuring conduit 55 may not suffer piping stress and thermal deformation due to a change in the ambient or medium conditions since they are secured to movable disks 52 which are supported elastically in a direction perpendicular to the axis and are movable with liquid-tight seals in an axial direction. A thus constructed flowmeter can achieve the accurate and stabilized measurement of a mass flowrate of a fluid with no negative effect. The vibrator 56 is secured to the center positions of the counterbalancing conduit 54 and the measuring conduit 55. When the frequency control unit 59 is not operating, the counterbalancing conduit 54 and the measuring conduit 55 are driven anti-phasely in the middle of their natural frequencies determined by spring constants.

The vibrator 56 consists of an electromagnetic coil and a core, wherein the core is electromagnetically attracted when current flows through the electro-magnetic coil. The sensors 57 and 58 are of the same construction, consisting of a sensing coil and a permanent magnet opposed thereto. For example, the sensing coil is mounted on the counterbalancing conduit 54 and the permanent magnet is mounted on the measuring conduit 55.

When measurements begin by switching ON the control transducer 62, a vibration sensed by one of the sensors e.g., the sensor 57 i.e. a signal of a vibration's frequency defined by the counterbalancing conduit 54 and the measuring conduit 55 is transmitted through a signal line 57a to the control transducer 62 which converts the signal received into a direct current (DC) signal, performs gain control in inverse proportion to the obtained DC level and drives the frequency control unit 59 through a driving line 59a and the vibrator at a constant amplitude through a driving line 56a.

The counterbalancing conduit 54 and the measuring conduit 55 are secured each to both ends of the movable disks 52 and 52 and, therefore, they have the same length. If the counterbalancing conduit 54 has a natural frequency rs, a spring constant Ks and a mass Ms, and the measuring conduit 55 has a natural frequency $F_M$, a spring constant $K_M$ and a mass $M_M$ and contains therein a mass $M_L$ of fluid to be measured, it is represented as follows:

$$fs = \frac{1}{2\pi} \left( \frac{Ks}{Ms} \right)^{\frac{1}{2}} \quad (1)$$

$$f_M = \frac{1}{2\pi} \left( \frac{K_M}{M_M + M_L} \right)^{\frac{1}{2}} \quad (2)$$

Generally, $Ks/Ms > K_M/(M_M+M_L)$, therefore, $$fs > f_M \quad (3)$$

The natural frequency fs of the counterbalancing conduit 54 is larger than the natural frequency $f_M$ of the measuring conduit 55.

Therefore, the counterbalancing conduit 54 is equipped with a weight to make its natural frequency fs be substantially equal to the natural frequency $f_M$ of the measuring conduit, i.e., $fs \approx f_M$.

On the contrary, when the natural frequency fs of the counterbalancing conduit 54 is adjusted by the method based on the tuning fork principle to the natural frequency $f_M$ of the measuring conduit 55 i.e. $fs = f_M$, it is possible to get a minimum value of driving energy i.e. driving current of the vibrator 56 needed to drive the counterbalancing conduit 54 and measuring conduit 55 anti-phasely at a constant amplitude. To attain the condition of $fs = f_M$, it is required to either decrease the spring constant Ks or to increase the mass Ms of the counterbalancing conduit 54. In the shown case the spring constant Ks of the counterbalance conduit 54 is equivalently decreased.

Figure 6A:
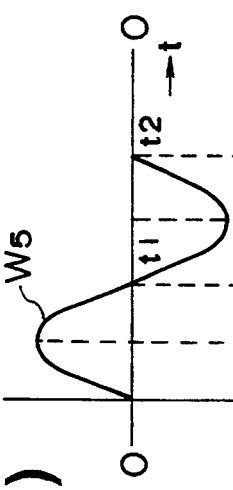
FIGS. 6(a)–6(d) are views for explaining how to drive a counterbalancing conduit and a measuring conduit, according to the present invention.
Figure 6B:
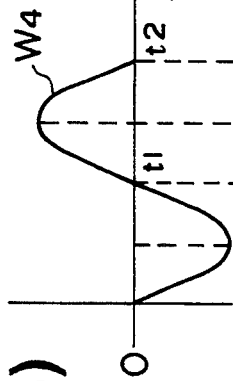
Figure 6C:
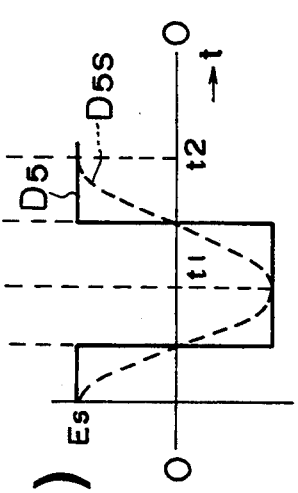
Figure 6D:
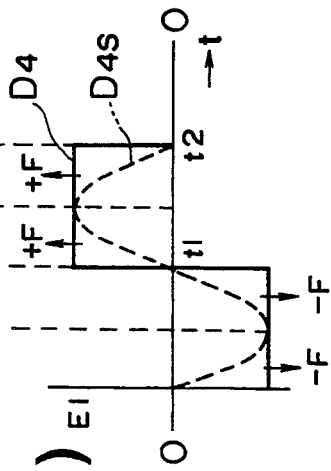

FIGS. 6(a)-6(d) are views for explaining how to drive the counterbalancing conduit 54 and the measuring conduit 55. FIG. 6(a) shows a vibration waveform W5 of the measuring conduit 55 and FIG. 6(b) shows a vibration waveform W4 of the counterbalancing conduit 54. FIG. 6(c) shows waveforms D5, D5s of driving voltage for the measuring conduit 55 and FIG. 6(d) shows waveforms D4, D4s of frequency control voltage for the counterbalancing conduit 54.

As shown in FIGS. 6(a) and 6(b), the vibration waveform W4 of the counterbalancing conduit 54 and the vibration waveform W5 of the measuring conduit 55 differ from each other in phase by 180°. Namely, the vibration waveform W5 is obtained by driving the measuring conduit 55 (FIG. 6(a)) with the driving voltage of the sinusoidal waveform W5s (or rectangular pulse W5) leading by 90° in phase from the vibration waveform W5 shown in FIG. 6(c). When the vibration waveform W5 attains its peak at Zero vibrational speed, the driving voltage of waveform D5s becomes zero. When the vibration waveform W5 attains zero level at the maximal vibrational speed, the driving voltage of waveform D5s gets the maximal amplitude.

On the other hand, the counterbalancing conduit 54 (FIG. 6(b)) is driven in such a way that the spring constant Ks may be apparently decreased. Decreasing the spring constant Ks increases the amplitude of the vibration at the same driving force. On the contrary, driving the counterbalancing conduit 54 in the direction of increasing the amplitude value apparently decreases its spring constant Ks. As shown in FIG. 6(d), the vibration waveform W4 and the driving voltage waveform D4s are in-phase. When the vibration waveform W4 is negative (0−t1), a negative force (−F) is applied to the counterbalancing conduit 54. When the vibration waveform W4 is positive (t1−t2), a positive force (+F) is applied to the counterbalancing conduit 54. The spring constant Ks of the counterbalancing conduit 54 can be increased by reversing the phase of the driving voltage D4s.

The frequency control unit 59 is supplied with a driving voltage of waveform D4S whose amplitude is automatically adjusted by a computing circuit of control transducer 62 so that the driving current or voltage of the vibrator 56 may get the minimal value. In this condition, the natural frequency fs of the counterbalancing conduit 54 is equal to the natural frequency $f_M$ of the measuring conduit 55, i.e., $fs = f_M$.

Figure 7:
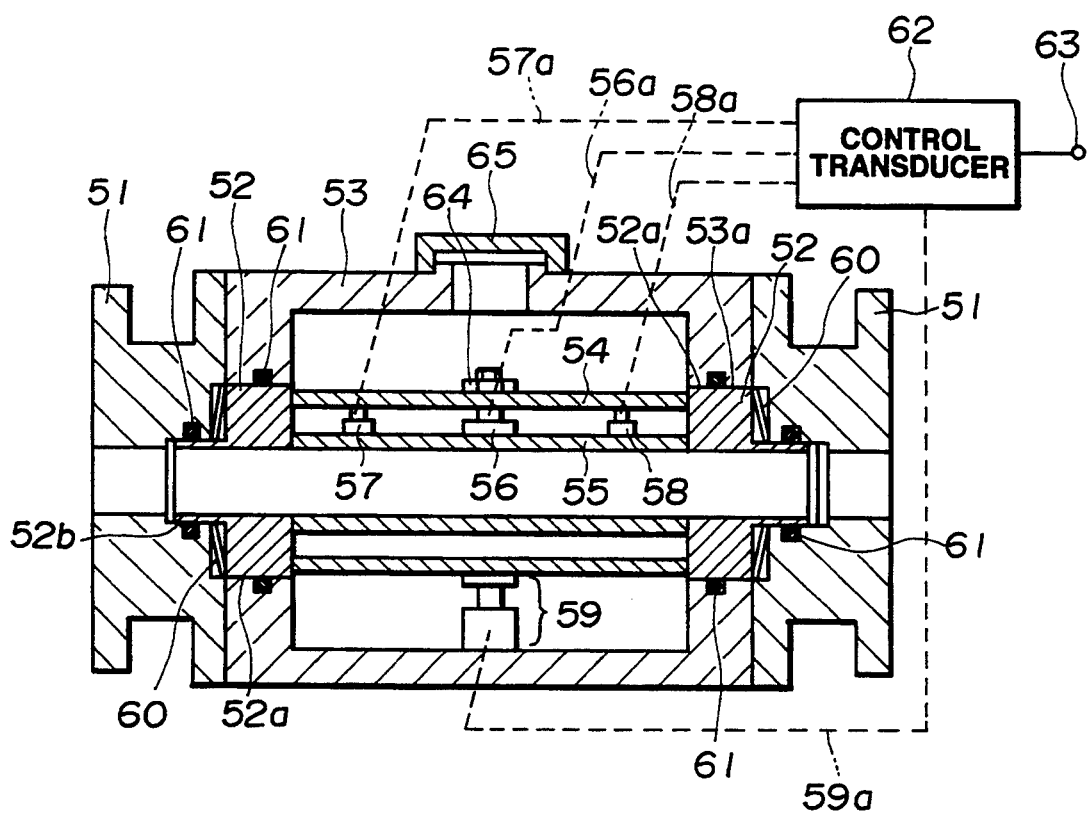
FIG. 7 is a sectional construction view for explaining another object embodiment of the Coriolis flowmeter according to the present invention.

FIG. 7 is a sectional construction view for explaining another example of controlling a natural frequency of an outer conduit in the Coriolis flowmeter according to the present invention. In FIG. 7, numerals 64 and 65 designate a weight and a cap respectively, and other parts similar in function to those of FIG. 5 are indicated with like reference numerals.

The weight 64 is attached to the center portion of the counterbalancing conduit 54 and it is predetermined in such a way that the natural frequency of the counterbalancing conduit 54 may be equal to that of the measuring conduit 55 when fluid to be measured is absent or fluid normally flows through the measuring conduit 55. The weight 64 is secured with a screw to the wall of the counterbalancing conduit 54 and can be adjusted to the desired weight through the service hole in the housing 53. The service hole is covered with the cap 65. With the weight 64 thus adjusted, a driving voltage of waveform D4s to be fed to the frequency control unit 59 in the usual flow measurement is reduced in size and the measurement of the fluid's flow can be effected even if the fluid density changes within a wide range. The fluid density can be determined by the expression (3).

In the embodiments shown in FIGS. 5 and 7, the counterbalancing conduit and the measuring conduit are coaxially assembled, the latter in the former, to form a mass flow measuring portion which is liquid-tightly sealed and disposed movably in the axial direction within the cylindrical housing which is connected by flanges to flow piping and the provision is made to always keep the natural frequency of the counterbalancing conduit equal to that of the measuring conduit. The mass flow measuring portion can be effectively driven at a stabilized frequency without specially adjusting the weight of the counterbalancing conduit even in the case of measuring a different kind of fluid or the same fluid at different temperatures. Thus constructed Coriolis flowmeters are capable of accurately measuring mass flow with no effect from an external vibration or from ambient temperature. In addition, the density of the fluid to be measured can be precisely determined.

Figure 8:
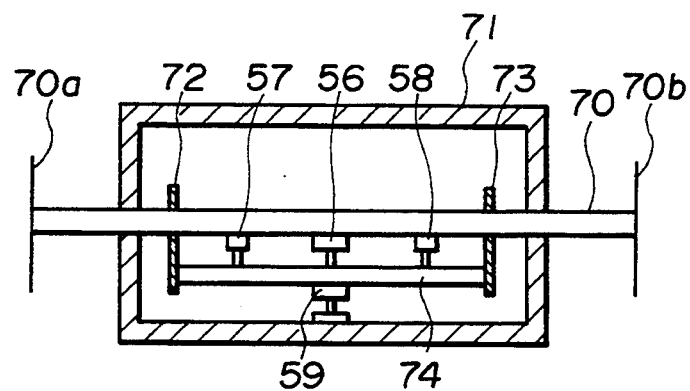
FIG. 8 is a typical view for explaining another embodiment of the Coriolis flowmeter according to the present invention.
Figure 9:
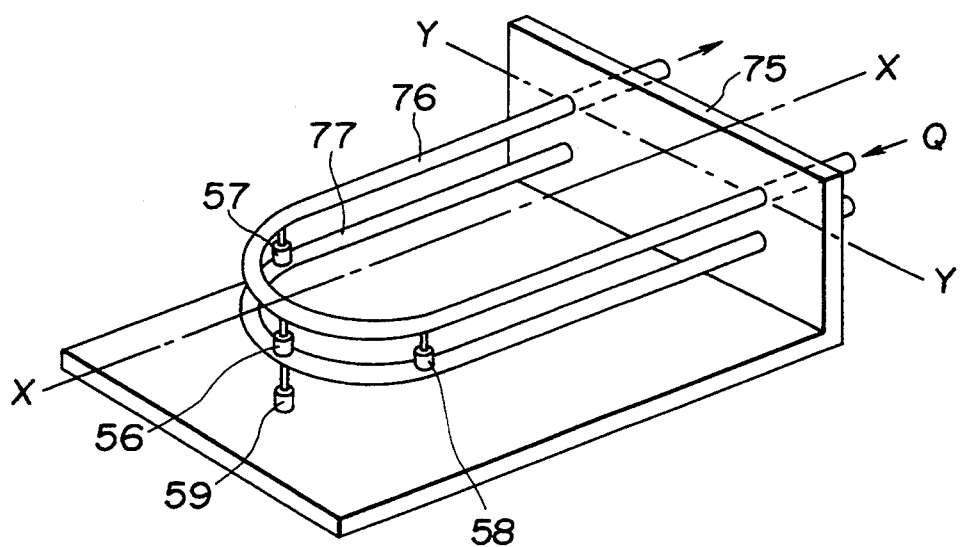
FIG. 9 is a perspective view for explaining a further embodiment of the Coriolis flowmeter according to the present invention.

Although the above-described embodiments represent straight conduit type Coriolis flowmeters, each of which has a counterbalancing conduit 54 and a measuring conduit 55 coaxially assembled therein, the present invention may also be applied to general counterbalancing type Coriolis flowmeters as shown in FIGS. 8 and 9.

FIG. 8 is a construction view for explaining another embodiment of the Coriolis flowmeter, according to the present invention, wherein there is shown a universal straight-conduit type counterbalanced Coriolis flowmeter comprising a measuring conduit 70, a frame 71, supporting plates 72 and 73, a counterbalancing conduit 74, a vibrator 56, sensors 57 and 58, a frequency control unit 59. In FIG. 8, the measuring conduit 70 is connected at its flanged ends 70a and 70b to flow piping and is covered with the frame 71 secured to near-end portions thereof. The measuring conduit 70 within the frame 71 is equipped with the supporting plates 72 and 73 disposed thereon at a specified space therebetween. The counterbalancing conduit 74 through which no fluid flows is disposed parallel to the measuring conduit 70 and secured at both ends to the supporting plates 72 and 73. The vibrator 56 is secured to the center portions of the measuring conduit 70 and the counterbalancing conduit 74. The sensors 57 and 58 are disposed symmetrically about the vibrator 56 on the measuring conduit 70 and the counterbalancing conduit 74 and secured thereto. The frequency control unit 59 is mounted between the frame 71 and the counterbalancing conduit 74 to drive the latter in the direction of its displacement so that the counterbalancing conduit may vibrate at a frequency equal to the natural frequency of the measuring conduit.

FIG. 9 is a perspective view for explaining a further embodiment of the Coriolis flowmeter, according to the present invention, wherein there is shown a supporting member 75, a curved measuring conduit 76 and a counterbalancing conduit 77. A measuring conduit 76 wherein fluid flows in the direction indicated by arrows Q is firmly fitted at its projecting ends in the holes made in the supporting member 75 at the positions evenly spaced from line X—X and aligned on line Y—Y as shown in FIG. 9, and the counterbalancing conduit 77 wherein no fluid flows is disposed parallel to the measuring conduit 76 and is firmly fitted at its projecting ends in holes made in the supporting member 75. A vibrator 56 is disposed on the line X—X and secured between the measuring conduit 76 and the counterbalancing conduit 77 for driving the conduit system antiphasely like a tuning fork. The sensors 57 and 58 are disposed symmetrically about the line X—X and parallel to line Y—Y and secured between the measuring conduit 76 and the counterbalancing conduit 77. The frequency control unit 59 is disposed between the counterbalancing conduit 77 and the supporting member 75 and it drives the counterbalancing conduit 77 in the direction of the displacement so that the counterbalancing conduit 77 may get the same frequency as the measuring conduit 76.

Figure 10A:
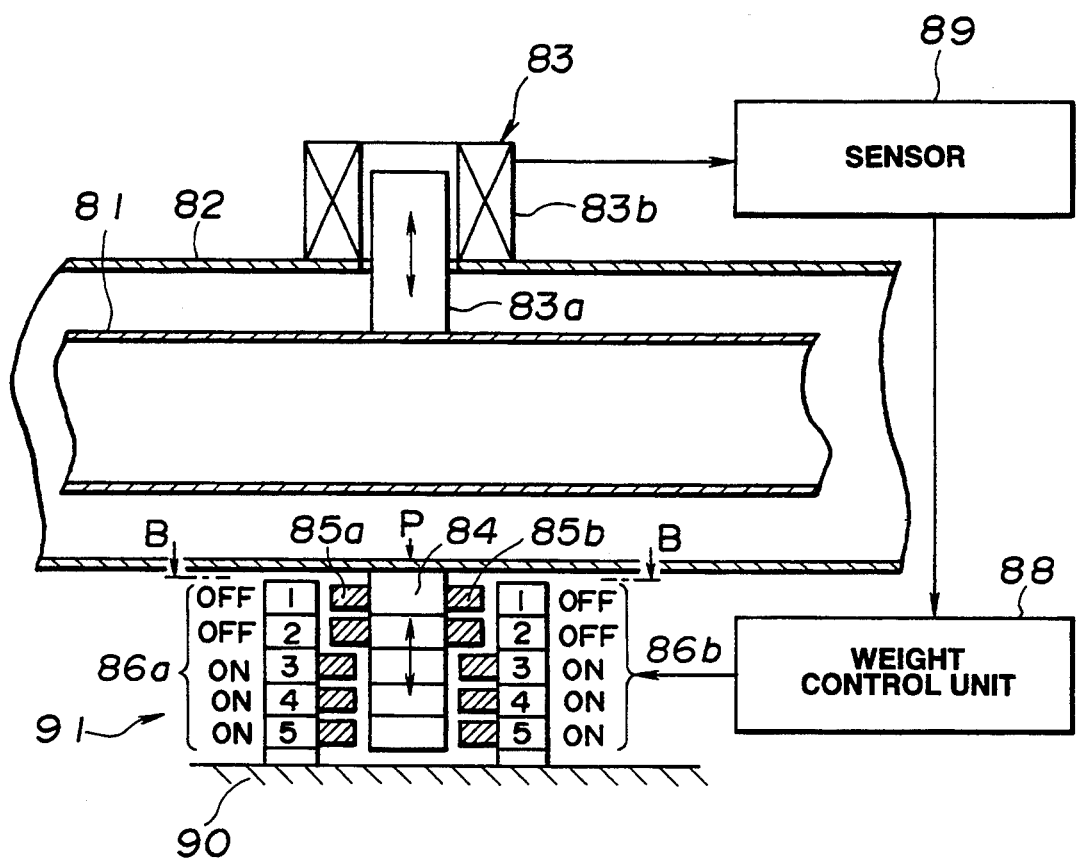
FIGS. 10(a) and 10(b) are partially sectional views for explaining the construction of a Coriolis flowmeter according to the present invention.
Figure 10B:
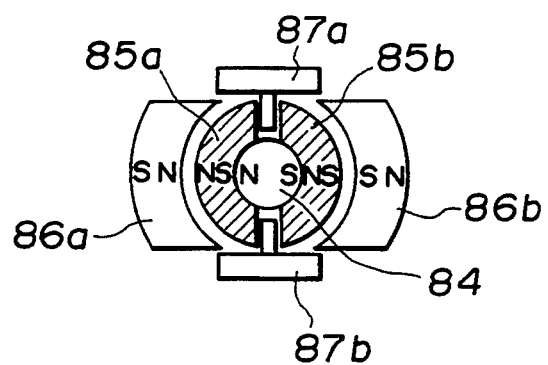

FIGS. 10(a) and 10(b) are segmentary views for explaining another example of controlling a natural frequency of an outer conduit in a Coriolis flowmeter according to the present invention. FIG. 10(a) shows an essential portion, in section, of the Coriolis flowmeter and FIG. 10(b) is a sectional view taken on line B—B of FIG. 10(a). In the drawings, there is shown a measuring conduit 81, a counterbalancing conduit 82, a vibrator 83, a magnet holding column 84, flat half-ring magnets 85a and 85b, driving magnets 86a and 86b, guide members 87a and 87b, a weight control unit 88, a driving current sensor 89, a supporting member 90 and a weight mounting means 91.

The measuring conduit 81 and the counterbalancing conduit 82 are coaxially supported each at both ends in the supporting cylinder (not shown). The vibrator 83 consisting of a core 83a and a coil 83b is mounted at the middle portion between the measuring conduit 81 and the counterbalancing conduit 82, and the sensors (not shown) are arranged symmetrically thereon about the vibrator 83.

The weight mounting means 91 is mounted opposite to the vibrator 83 between the middle portion's wall surface P of the counterbalancing conduit 82 and the supporting surface 90 of the supporting cylinder. The weight mounting means 91 consists of a magnet holding column 84, a plurality of the paired flat half-ring magnets 85a and 85b and a plurality of paired driving magnets 86a and 86b. It is driven by the weight control unit 88 and the driving current sensor 89. The magnet holding column 84 is a columnar magnet made of magnetic material e.g., a permanent magnet, an electro-magnet or permalloy of high magnetic permeability, which is divided in its axial direction into sections each corresponding in thickness to each of the paired flat half-ring magnets 85a and 85b. This columnar magnet is secured at its one end only to the middle portion's wall surface P of the counterbalancing conduit 82 and its other end is free. Each pair of flat half-ring magnets 85a and 85b, which are used as a set of weights, are made by substantially halving in a radial direction a ferromagnetic or magnetic sheet ring having an inner diameter equal to the outer diameter of the magnet holding column 84. The number of pairs of flat half-ring magnets (85a, 85b; 85a$_2$, 85b$_2$; . . . ) are equal to the sections of the magnet holding column 84.

The driving magnets 86a and 86b are, for example, paired stacks of electromagnets, which are secured to the inside wall surface 90 of the supporting cylinder. As shown in FIG. 10(a), the electromagnets 86a (86b) (indicated by rectangles with numerals 1, 2, 3, 4, 5) in each stack are arranged opposite to the flat half-ring magnets 85a (85b) on the magnet holding column 84. The paired electromagnets 86a and 86b attract or repel the corresponding half-ring magnets 85a and 85b according to control signals from the weight control unit 88. The paired flat half-ring magnets 85(a) and 85(b) move to or from the magnet holding column 84, being attracted or repelled by the paired driving electromagnets 86a and 86b according to a control signal from the weight control unit 88. The flat half-ring magnets 85a and 85b can move along a predetermined locus in a radial direction. The guide members 87a and 87b are used for preventing the movement of the flat half-ring magnets 85a and 85b in the circumferential direction if the need be.

As described above, the counterbalancing type driving system composes a part of a positive feedback amplifier circuit that detects a signal from a displacement sensor (not shown) at one side of the counterbalancing conduit 82 and drives the coil 83b of the vibrator 83 so as to keep a constant amplitude of oscillation of the measuring conduit 81. The driving current, i.e., driving energy is reduced to the minimum when the natural frequency $f_M$ of the measuring conduit 81 is equal to the natural frequency fs of the counterbalancing conduit 82, i.e., the tuning-folk condition $f_M$=fs is attained. On the contrary, when the natural frequencies of the two conduits are different from each other, i.e., $f_M \neq$ fs, the driving efficiency decreases and the driving current increases. This driving current is detected by the sensor 89. The counterbalancing conduit 82 and the measuring conduit 81 are secured at both ends to the supporting members and, therefore, they have the same length. If the counterbalancing conduit 82 has a spring constant Ks' and a mass Ms' and the measuring conduit 81 has a spring constant $K_M'$ and a mass $M_M'$ and contains therein a mass Mn of the fluid to be measured, the previously described equations (1) and (2) are effected. In general, Ks/Ms>Kv/(Mv+$M_L$) and, therefore, fs>$f_M$, i.e., the natural frequency (fs) of the counterbalancing conduit 82 is larger than that ($f_M$) of the measuring conduit 81. Therefore, the weight is added to the counterbalancing conduit 82 to make its natural frequency fs be substantially equal to the natural frequency $f_M$ of the measuring conduit 82, i.e., fs=$f_M$.

The weight control unit 88 contains a drive sequence circuit that sequentially drives the driving magnets 86a and 86b by turning the driving current ON and OFF thereto. When the driving current is turned OFF, a repelling field is produced between the flat half-ring magnets 85a, 85b and the driving magnets 86a, 86b, thereby the flat half-ring magnets 85a, 85b rest on the magnet holding column 84. Consequently, the mass Ms of the counterbalancing conduit 82 is increased and its natural frequency fs is lowered. When the driving current is turned ON, they are attracted by the driving magnets 86a, 86b to decrease the mass Ms and to raise the natural frequency fs of the counterbalancing conduit 82.

Figure 11:
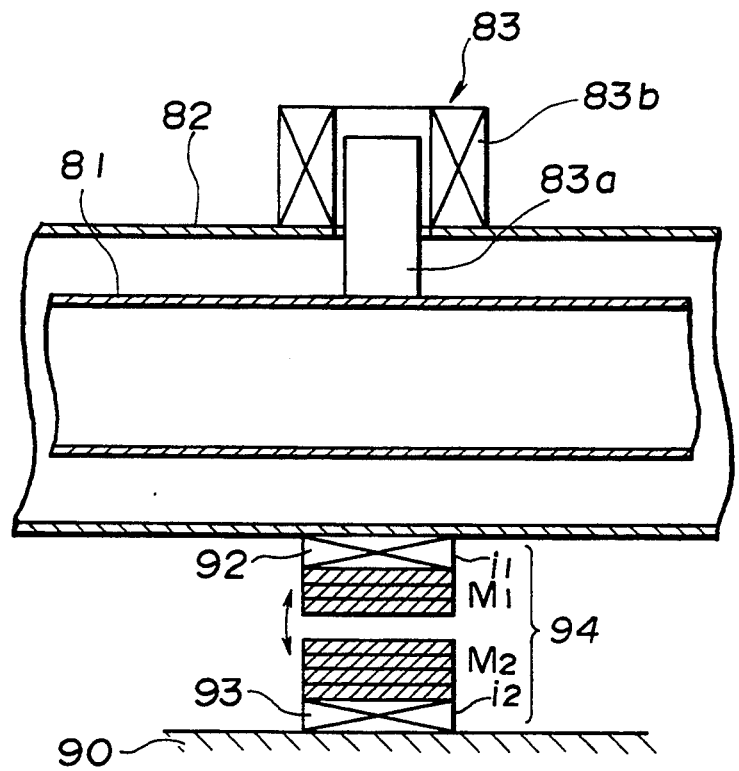
FIG. 11 is a partially sectional view for explaining another example of controlling a natural frequency of an outer conduit in the Coriolis flowmeter according to the present invention.

FIG. 11 is a segmentary view for explaining another example of controlling a natural frequency of an outer conduit in the Coriolis flowmeter, according to the present invention, wherein numerals 92, 93 designate electromagnets, numeral 94 designates magnetic sheets and other elements similar in function to those shown in FIG. 10 are indicated by like reference numerals. The electromagnet 92 is secured to the outer wall's surface of the middle portion of the counterbalancing conduit 82 and the electromagnet 93 is secured to the supporting member to face the electromagnet 92. Both electromagnets 92 and 93 are driven with currents $i_1$ and $i_2$ respectively to make them oppose each other with unlike poles. The electromagnets 92 and 93 attract a plurality of magnetic sheets (weights) 94 placed therebetween. The numbers of the magnetic sheets 94 to be attracted to the electromagnets 92 and 93 respectively can be determined by adjusting the values of the currents $i_1$ and $i_2$ to be applied to the electromagnets 92 and 93 respectively. If the adjustment is made to increase (or decrease) the number of magnetic sheets 94 to be attracted to the electromagnet 92, the mass M1 increases (or decreases) and the natural frequency fs decreases (or increases). The values of the driving currents $i_1$ (for electromagnet 92) and $i_2$ (for electromagnet 93) are determined according to a signal of the driving current sensor 89.

Figure 12:
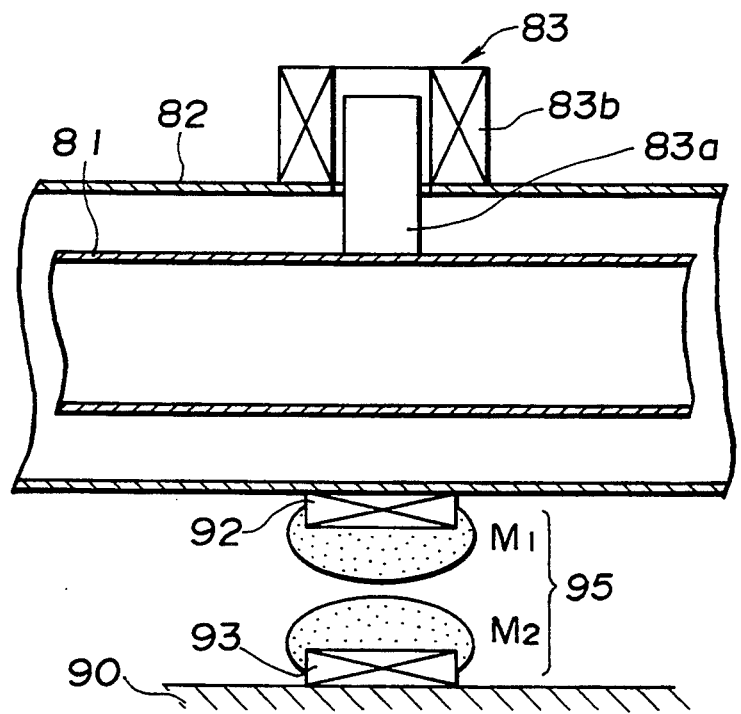
FIG. 12 is a partial sectional view for explaining another example of controlling a natural frequency of an outer conduit in the Coriolis flowmeter according to the present invention.

FIG. 12 is a segmentary view for explaining another example of controlling a natural frequency of an outer conduit in the Coriolis flowmeter according to the present invention. In FIG. 12, numeral 95 designates magnetic powder and other elements similar in function to those shown in FIG. 11 are indicated by like reference numerals. The magnetic powder 95 is, e.g., iron powder, permalloy powder and so on and has the same effect as the magnetic sheets 94 of FIG. 11. The electromagnets 92 and 93 are excited with driving currents $i_1$ and $i_2$ respectively to oppose at unlike poles to each other. The values of the driving currents $i_1$ and $i_2$ to be applied to the electromagnets 92 and 93 are determined according to signals of the driving current sensor 89. Consequently, the quantity of the magnetic powder 95 adhering to the electromagnet 92 of the counterbalancing conduit 82 is mass M1 determined according to the currents' values $i_1$ and $i_2$. The mass M1 determines the natural frequency fs of the counterbalancing conduit 82. While the above-described embodiments are the counterbalanced straight-conduit type Coriolis flowmeters which are devised according to the present invention. It is also possible to apply the present invention to the counterbalanced type Coriolis flowmeters shown in FIGS. 8 and 9.

As is apparent from the foregoing description, according to the present invention, it is possible to provide a counterbalanced type Coriolis flowmeter which is capable of making the natural frequency of a counterbalancing conduit be substantially equal to that of a measuring conduit by adding a specified weight to the counterbalancing conduit when the natural frequency of the measuring conduit considerably changes due to the change of density of fluid to be measured. This means that measurement of a displacement of the measuring conduit by the action of a Coriolis force can be performed under constant conditions, thereby the accuracy of the measurement is improved and effective measuring conditions are also obtained.

We claim:

1. A Coriolis flowmeter comprising:
a cylindrical outer housing having a pair of coaxial flanges, each connected to one end thereof, said cylindrical outer housing having a flanged inlet and end walls;
an inner conduit having a small diameter and coaxially secured at both ends thereof in the cylindrical outer housing, said inner conduit allowing measurable fluid to enter from the flanged inlet of the cylindrical outer housing and pass therethrough;
an outer conduit secured at both ends thereof to the respective end walls of the cylindrical outer housing and being coaxial with the inner conduit, said outer conduit having an outer wall with a center portion;

a vibrator disposed at a center portion between the inner conduit and the outer conduit for vibrating the inner conduit and the outer conduit in a natural frequency and with opposite phases in directions perpendicular to axes thereof;

natural frequency adjusting means provided on the center portion of the outer wall of the outer conduit to make the natural frequencies of the outer conduit and the inner conduit substantially equal to each other; and a pair of sensors, each sensor disposed between the inner and outer conduits and between the vibrator and a respective said end wall of the cylindrical outer housing to detect mass flow proportional to a phase difference obtainable between the sensors.

2. A Coriolis flowmeter as defined in claim 1, wherein each end wall of the cylindrical outer housing is separated into a ring portion and a movable disk portion to which the inner conduit and the outer conduit are coaxially secured, said movable disk portions being movable in an axial direction thereof; and further comprising:

sealing means for movably sealing each movable disk portion and each ring portion; and springs for supporting respective said movable disk portions.

3. A Coriolis flowmeter comprising:

a supporting member;

a measuring conduit secured at both ends thereof to the supporting member, said measuring conduit allowing measurable fluid to flow therethrough;

a counterbalancing conduit secured at both ends thereof to the supporting member;

a vibrator mounted on the measuring conduit and the counterbalancing conduit for driving both the measuring conduit and the counterbalancing conduit in a natural frequency and with opposite phases in directions perpendicular to axes thereof;

sensors disposed between the measuring conduit and the counterbalancing conduit for sensing a displacement produced between the measuring conduit and the counterbalancing conduit according to a Coriolis force acting on the measuring conduit; and a frequency control unit for driving the counterbalancing conduit in a direction of displacement at a frequency equal to the natural frequency of the measuring conduit, the natural frequency varying in accordance with density of fluid flowing therethrough.

4. A Coriolis flowmeter as defined in claim 3, further comprising:

a body frame connected at opposite ends thereof to flow pipings and secured to both ends of the measuring conduit; and two supporting plates disposed within the body frame, each secured to one end of the measuring conduit for securely holding both ends of the counterbalancing conduit therebetween.

5. A Coriolis flowmeter as defined in any of claims 3 and 4, further comprising:

a frequency control unit that detects a driving current of the vibrator for driving the integrally assembled measuring conduit and counterbalance conduit with opposite phases and minimizes the driving current by driving the counterbalancing conduit in the direction of the displacement at a frequency equal to the natural frequency of the measuring conduit, the natural frequency varying in accordance with density of fluid flowing therethrough.

6. A Coriolis flowmeter comprising:

a supporting member;

a measuring conduit secured at both ends thereof to the supporting member, said measuring conduit allowing measurable fluid to flow therethrough;

a counterbalancing conduit secured at both ends thereof to the supporting member;

a vibrator mounted on the measuring conduit and the counterbalancing conduit for driving the measuring conduit and counterbalancing conduit in a natural frequency and with opposite phases in directions perpendicular to axes thereof;

a pair of sensors for sensing a displacement produced between two specified points on the measuring conduit and the counterbalancing conduit according to a Coriolis force acting on the measuring conduit;

means to produce an output of mass flowrate proportional to a difference of outputs of said pair of sensors;

driving current sensing means for detecting a driving energy of the vibrator, weight mounting means for mounting weights on the center portion of the measuring conduit or counterbalancing conduit; and a weight control unit for driving the weight mounting means to attach a weight to the measuring conduit or the counterbalancing conduit in such a way that the energy detected by the driving current sensing means is reduced to a minimum.

7. A Coriolis flowmeter as defined in claim 6, wherein the weight mounting means is comprised of:

a magnet holding column made of magnetic material and secured vertically at one end thereof to an outer wall of the counterbalancing conduit, said magnet holding column having a plurality of divided sections, a plurality of driving magnets secured to the supporting member in such an arrangement that each driving magnet opposes a respective section of the magnet holding column, a plurality of paired flat half-ring magnets which are disposed between the magnet holding column and paired stacks of separate driving magnets and which are normally attached to the magnet holding column and can be separated therefrom and attached to the driving magnet stacks when the driving magnets are driven.

8. A Coriolis flowmeter as defined in claim 6, wherein the weight mounting means is comprised of:

a first electromagnet secured to an outer wall of the counterbalancing conduit;

a second electromagnet opposing the first electromagnet with a specified space therebetween and secured to the supporting member;

a plurality of magnetic sheets disposed between the first electromagnet and the second electromagnet; and the number of the magnetic sheets to be attracted to the first electromagnet is selectively adjusted by a difference of currents to be applied to the first electromagnet and the second electromagnet.

* * * * *